United States Patent Office 3,690,830
Patented Sept. 12, 1972

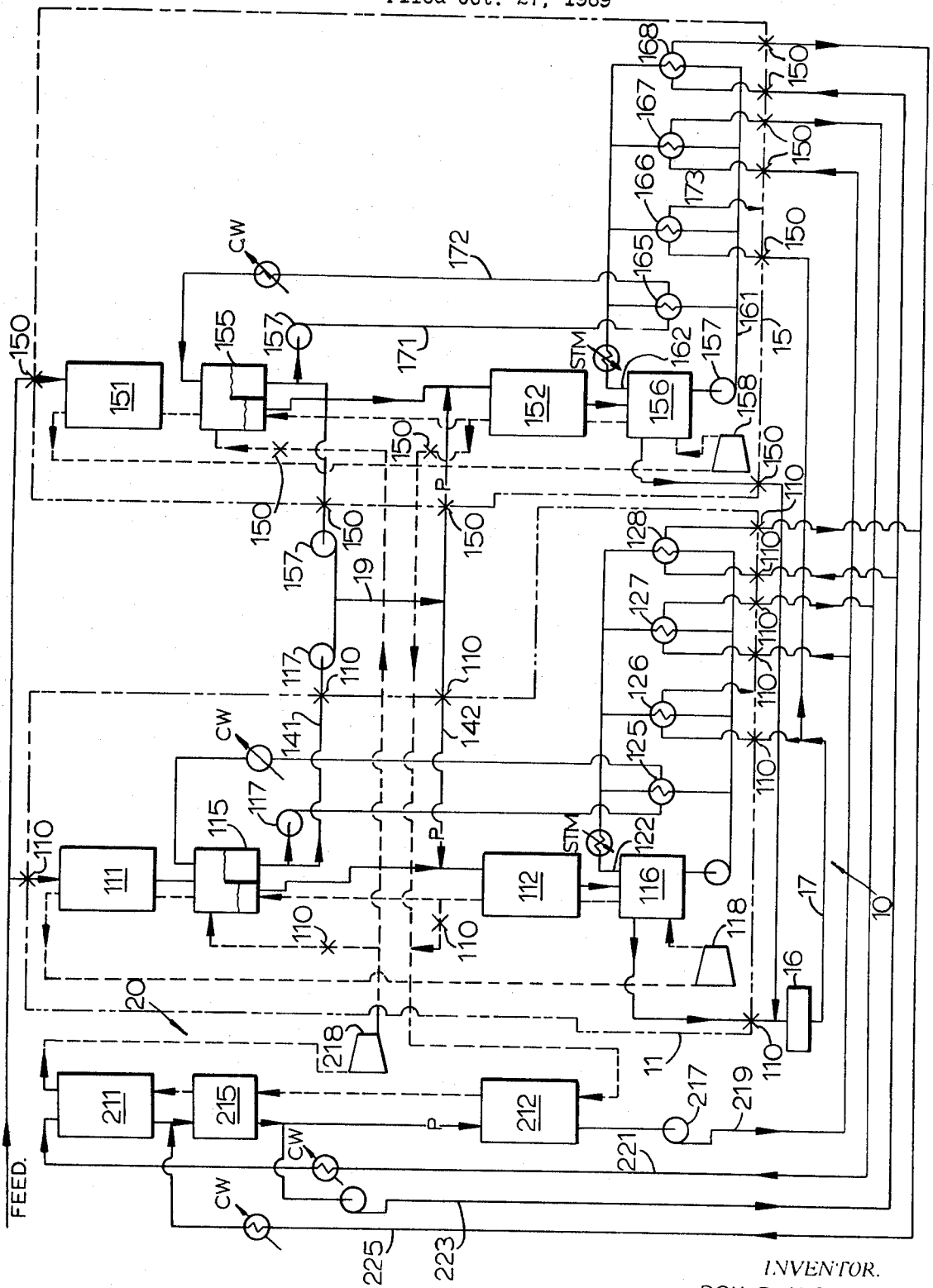

3,690,830
ISOTOPE SEPARATION WITH HEAT BALANCING
Don Barkley Nazzer, Port Hawkesbury, Nova Scotia, Canada, assignor to Canadian General Electric Company, Limited, Toronto, Ontario, Canada
Filed Oct. 27, 1969, Ser. No. 869,689
Claims priority, application Canada, Nov. 30, 1968, 36,564
Int. Cl. C01b 5/02; B01j 1/00
U.S. Cl. 423—580
9 Claims

ABSTRACT OF THE DISCLOSURE

The heat exchange provisions for a heavy water separation plant first stage having a plurality of parallel flow sub-stages permits selective isolation of one of the sub-stages from the plant, with the provision of thermal compensation to the plant to maintain thermal balance of the process.

---

This invention is directed to a method of heat exchange in a fluid-to-fluid exchange process, and in particular to the provision of method and apparatus for the operation of an isotope exchange system.

In carrying out exchange process involving thermal exchange between different fluids the problems of heat economy are of considerable economic significance.

In addition, in operating a multi-stage process utilizing plural units in parallel flow relation feeding product to a subsequent stage, problems of control stability are experienced when it is necessary to shut-down one of the parallel flow stage units. Control is complicated by the need to effect a balance between heat transfer flow by way of process fluid, and the variation of heat flows necessary to secure desired process thermal conditions.

A preferred embodiment of the present invention is disclosed, directed to an isotope separation system for the production of heavy water, deuterium oxide ($D_2O$), using a water-hydrogen sulfide exchange.

In operating a water-hydrogen sulfide multi-stage isotope exchange apparatus, owing to the large reduction in through-put between the first stage and subsequent stages it is usual to provide a first stage having a plurality of units in parallel flow relation. The enriched product from the plural first stages is fed to one or more subsequent stages arranged in series process flow therewith. Due to the highly corrosive nature of hydrogen sulfide it is desirable to be able to close down a selected one of the first sub-stages for maintenance purposes without unduly interfering in the operation of the remainder of the plant, in view of the economic need to maintain plant production, and the difficulties associated with shutting down and subsequently restarting the complete plant. Thus, while it is desirable to be able to shut down one of the first sub-stages problems arise in providing stable feed to the plant second stage. The problems of satisfactory isolation of one such parallel flow sub-stage unit is made more difficult because the control and interchange of large quantities of heat are involved if efficient process is to be achieved. The satisfactory operation of the plant is further dependent upon the maintenance of predetermined temperature conditions in the hot tower and cold tower portions of each stage.

The present invention provides a method of operating an isotope enrichment process having a gas and a liquid passing in counter-flow isotope exchange relation through a plurality of stages arranged in mutual series flow relation including a preceding stage and a stage subsequent thereto, the preceding stage having a plurality of sub-stage portions in mutual parallel flow relation supplying isotope enriched feed fluid to the subsequent stage, including the steps of dehumidifying the gas in the subsequent stage by directly cooling the gas in a gas to liquid heat exchange loop and selectively transferring a portion of heat in the thus heated liquid to a plurality of heat exchanges arranged in mutual parallel flow relation in the preceding stage, shutting down one of the preceding stage heat exchangers, and adjusting the heat transfer with the preceding stage whereby operation of the subsequent stage may be maintained.

To carry out the foregoing method there is provided process flow apparatus comprising an isotope exchange system having a first stage feeding isotope enriched fluid to a second stage, the second stage having a hot section and a cold section wherein liquid and gas pass in counter-flow isotope exchange, the second stage sections being maintained within predetermined thermal limits and predetermined limits of isotope enrichment, the improvement comprising subdividing the first stage into a plurality of sub-stages, each sub-stage having a hot section and a cold section and heat exchanger means to maintain thermal balance in the sub-stages, flow isolating means to provide selective isolation of the sub-stage, and thermal compensating means whereby the temperature of fluids continuing to pass to the second stage may be selectively adjusted to within the predetermined limits on shutting down the first sub-stage.

Certain embodiments of the invention are described, reference being had to the accompanying drawing showing a schematic arrangement illustrating the invention.

In the drawing there is illustrated two stages of an isotope exchange plant, having a second stage receiving isotope enriched fluid from a first stage.

While for purposes of illustration the second stage 20 is illustrated as receiving enriched hydrogen sulfide ($H_2S$) from the first stage 10, it will be understood that enrichment may be passed to the second stage 20 by way of enriched water, having an enhanced isotopic content.

The first or preceding stage 10 is illustrated as having only two sub-stage portions 11 and 15 in mutual parallel flow relation for ease of illustration. However the use of more than two such process parallel stage portions is contemplated. Each sub-stage is shown enclosed in a chain dotted enclosure to indicate the capability of being individually isolated from the process flows.

Each first stage portion 11, 15 comprises a cold tower portion 111, 151 respectively and a hot tower portion 112, 152.

Similarly the second stage 20 comprises a cold tower portion 211 and a hot tower portion 212.

While each stage or sub-stages illustrated as having separate hot and cold towers, the respective cold and hot tower portions 111, 112, 151, 152; and 211, 212 of each stage or sub-stage may be embodied in the form of a stacked unitary tower. This does not constitute subject matter of the present invention.

In the first stage 10, each of the parallel substage portions 11, 15 is provided respectively with a gas dehumidifier 115; 155, and a humidifier 116; 156.

The second stage 20 is illusrtated as having a dehumidifier 215. Gas flow ($H_2S$) between components of the plant is provided by compressors 118, 158 and 218, the respective gas flow lines or pipes being shown dotted.

Water flow in the plant is provided by pumps 117; 157 and 217. While being of differing capacity, the plurality of pumps 117 and the plurality of pumps 127, are not distinguished for purposes of reference. The water flow lines or pipes are indicated as solid lines.

Heat input to each humidifier 116, 156 is provided respectively by a water circuit connected with a number of heat sources, each having an exchanger in heat exchange relation with the water circuit. The water heater circuits comprise outlet headers 121, 161 and return headers 122, 162 respectively.

The heater circuit for each sub-stage humidifier 116, 156 is illustrated as including exchangers 125, 126, 127, 128 and 165, 166, 167, 168 respectively. The exchangers 125, 165 are connected to the respective sub-stage dehumidifiers 115, 155, by water lines 131, 132; 171, 172, constituting heat transfer circuits.

The heat exchangers 126, 166 are both connected to the liquid outflow of gas stripper 16. Hot waste water leaving the stripper 16 by line 17, passes to the respective exchangers 126, 166 in paralell flow relation and then to drain, by lines 133, 173.

The heat exchangers 127, 167 of each sub-stage receive deuterium enriched hot water from the second stage hot tower 212, by way of feeder 219, and return 221 to the second stage.

The heat exchangers 128, 168 receive parallel flows of hot water from the second stage dehumidifier 215, by way of outlet 223 and return 225.

In the primary circuits of the illustrated substages 11, 15 enriched product from the respective dehumidifiers 115, 155 passes by way of lines 141, 181 to a common mixing header 19, and thence by way of lines 142, 182 to the respective hot towers 112, 152. Also in the primary circuits, gas from the second stage cold tower 211 passes by way of compressor 218 to the dehumidifiers 115, 155 of the first stage.

In various portions of the circuits are illustrated undesignated coolers and heaters, provided for purposes of temperature control, the cooling or heating functions of each device being indicated respectively by the arrowed legend CW (Cooling Water) or Stm (Steam), to denote a cooler or a heater respectively.

The sub-stages 11, 15 are isolated by chain-dotted lines. A plurality of isolation valves 110, 150 which are not individually differentiated make possible the selective isolation of one or other of the components 11 or 15.

In the event of shut-down of one or other of the sub-stages 11, 15 it will be seen that the fluid flow and heat transfer relationships betwen the first stage and the second stage can be maintained, to provide continuing operation of the plant. In order to preserve the essential process balance by way of maintaining prescribed thermal conditions, and to balance the isotopic enrichment between respective pairs of hot and cold towers, measured at the tower midpoints, thermal balance is achieved by adjustment of the auxiliary coolers and heaters, while isotopic balance is achieved by control of the respective quantities of gas and water passing between the respective hot and cold towers. Thus continuity of plant operation can be maintained, while providing the capability shutting down a selected sub-stage for carrying out maintenance on that selected portion of the plant.

What I claim as new and desire to secure by Letters Patent of the United States is:

1. In an isotope exchange system having a second process stage receiving enriched fluid feed from a first stage having a plurality of sub-stage units in mutual parallel flow relation, each said sub-stage unit providing water and hydrogen sulphide in counter-flow isotope exchange relation through a cold tower zone and a hot tower zone in each said stage to provide concenrtation of deuterium isotope in one of the two fluids, and heat balance means to control the temperature of the fluids in the respective cold and hot tower zones of each stage sub unit, including a hot water heat input loop connected with a humidifier in each said sub-stage, each said loop having a plurality of heat input circuit means connected thereto, at least one said heat input circuit means of each said sub-stage being connected with a heat source common to at least one other said loop; flow control valve means to isolate at least one said sub-stage from feeding relation with said second stage by isolating external feedwater, hydrogen sulphide and heat balance fluid flow connections thereto; and supplementary temperature compensated means to adjust a said heat input loop whereby partial process feed is maintained from remaining sub-stage units and heat balance in said second stage is promoted.

2. Apparatus as claimed in claim 1 wherein said first stage comprises three units in parallel process flow relation, and gas supply means connecting each said unit with said second stage.

3. Apparatus as claimed in claim 1 wherein each said first sub-stage comprises a cold tower portion, a hot tower portion, a gas dehumidifier section therebetween having an external water cooling loop, a gas humidifier section having an external water heating loop in heat exchange relation with said cooling loop and at least one heat exchanger connected with said common source.

4. Apparatus as claimed in claim 3 wherein said common source includes a gas stripper providing hot liquid effluent in heat exchange relation with said humidifier external loop.

5. Apparatus as claimed in claim 4, including a gas humidifier in said second stage having an external water circuit connected with each of said first sub-stage in heat transfer relation therewith.

6. Apparatus as claimed in claim 1, including a mixing header connected with each said sub-stage to receive isotope enriched water therefrom, and output means connecting said header with the respective said sub-stages, said isolating means including control valves to isolate the header from a selected said sub-stage.

7. A method of operating an isotope enrichment process having hydrogen sulphide and water passing in counter-flow isotope exchange relation through a plurality of stages arranged in mutual series flow relation including a preceding stage and a stage subsequent thereto, the preceding stage having a plurality of sub-stage portions in mutual parallel flow relation supplying isotope enriched feed fluid to the subsequent stage, including the steps of dehumidifying the gas in said subsequent stage by directly cooling the gas in a gas-to-liquid heat exchange loop by imparting heat to circulating liquid and selectively transferring a portion of heat in the thus heated liquid to a plurality of heat exchangers arranged in mutual parallel flow relation in said preceding stage, shutting down one said preceding stage heat exchanger, and adjusting by supplementary means the rate of heat transfer with the preceding stage to maintain satisfactory operation of said dehumidifier heat exchange loop whereby operation of the subsequent stage may be maintained.

8. The method as claimed in claim 7 wherein each said sub-stage includes at least one said heat exchanger.

9. The method as claimed in claim 7 wherein said heat transfer adjustment is effected by way of an auxiliary cooler in the liquid circuit of said subsequent stage dehumidifier.

References Cited

UNITED STATES PATENTS 3,411,884   11/1968   Thayer _____ 23—283 X

FOREIGN PATENTS 530,343   7/1956   Canada _____ 23—204

OSCAR R. VERTIZ, Primary Examiner

H. S. MILLER, Assistant Examiner

U.S. Cl. X.R.

23—283